United States Patent
Yamashita et al.

(10) Patent No.: US 6,658,009 B1
(45) Date of Patent: Dec. 2, 2003

(54) BAND ALLOCATION METHOD AND TRANSMISSION SYSTEM FOR TRANSMITTING VARIABLE-LENGTH PACKETS

(75) Inventors: Haruo Yamashita, Kanagawa (JP); Masatake Miyabe, Kanagawa (JP); Tomohiro Shinomiya, Kanagawa (JP); Kazuyuki Tajima, Kanagawa (JP); Masamichi Kasa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/460,917

(22) Filed: Dec. 14, 1999

(30) Foreign Application Priority Data

Dec. 28, 1998 (JP) .......................................... 10-372478

(51) Int. Cl.[7] .............................................. H04L 12/56
(52) U.S. Cl. .................................. 370/395.65; 370/449
(58) Field of Search ................................ 370/447, 449, 370/458, 461, 462, 395.1, 395.52, 395.65, 471

(56) References Cited

U.S. PATENT DOCUMENTS

| | | | | |
|---|---|---|---|---|
| 5,850,400 A | * | 12/1998 | Eames et al. | 370/443 |
| 6,317,234 B1 | * | 11/2001 | Quayle | 359/125 |
| 6,320,869 B1 | * | 11/2001 | Van Driel et al. | 370/443 |
| 6,359,900 B1 | * | 3/2002 | Dinakar et al. | 370/458 |

* cited by examiner

Primary Examiner—Melvin Marcelo
Assistant Examiner—Nhat Do
(74) Attorney, Agent, or Firm—Katten Muchin Zavis Rosenman

(57) ABSTRACT

In a system where a plurality of terminal units are connected to a network unit via an optical transmission line and packets are transmitted in units of cells according to polling information, polling request information including the number of variable-length packets stored in the buffer of each of the terminal unit, the number of cells composing each variable-length packet and the number of remaining cells of a packet being read is created, polling information corresponding to a time slot allocated according to the polling request information is transmitted from the shared band control unit of the network unit, and bands are allocated to the plurality of terminal units.

15 Claims, 9 Drawing Sheets

| SERVICE CLASS_1 |
|---|
| NUMBER OF REMAINING CELLS OF A PACKET BEING READ $Brq(n,0)$ |
| NUMBER OF CELLS OF THE FIRST PACKET $Brq(n,1)$ |
| NUMBER OF CELLS OF THE SECOND PACKET $Brq(n,2)$ |
| SERVICE CLASS_2 |
| NUMBER OF REMAINING CELLS OF A PACKET BEING READ $Brq(n,0)$ |
| NUMBER OF CELLS OF THE FIRST PACKET $Brq(n,1)$ |
| NUMBER OF CELLS OF THE SECOND PACKET $Brq(n,2)$ |

FIG. 3

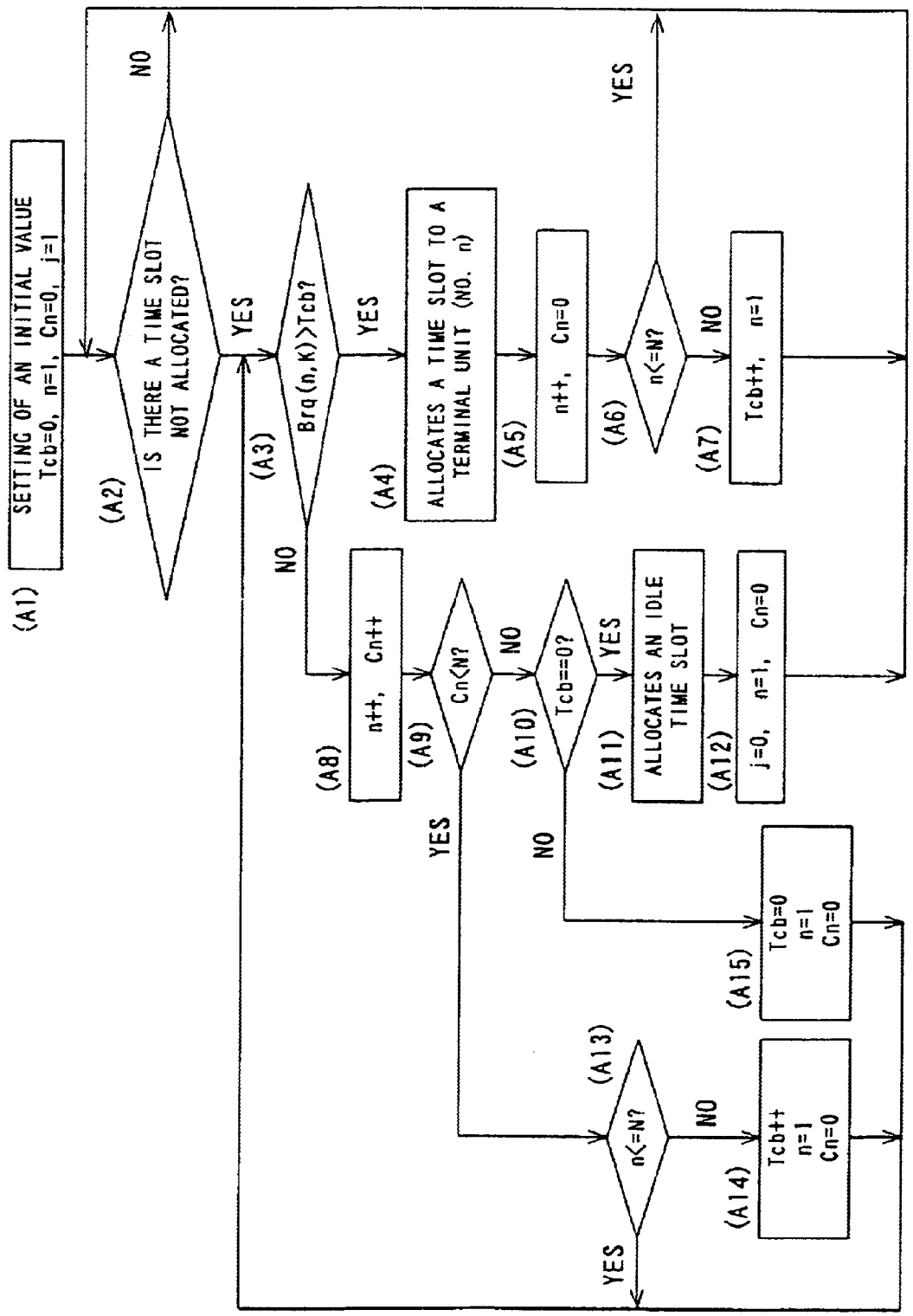
F I G. 4

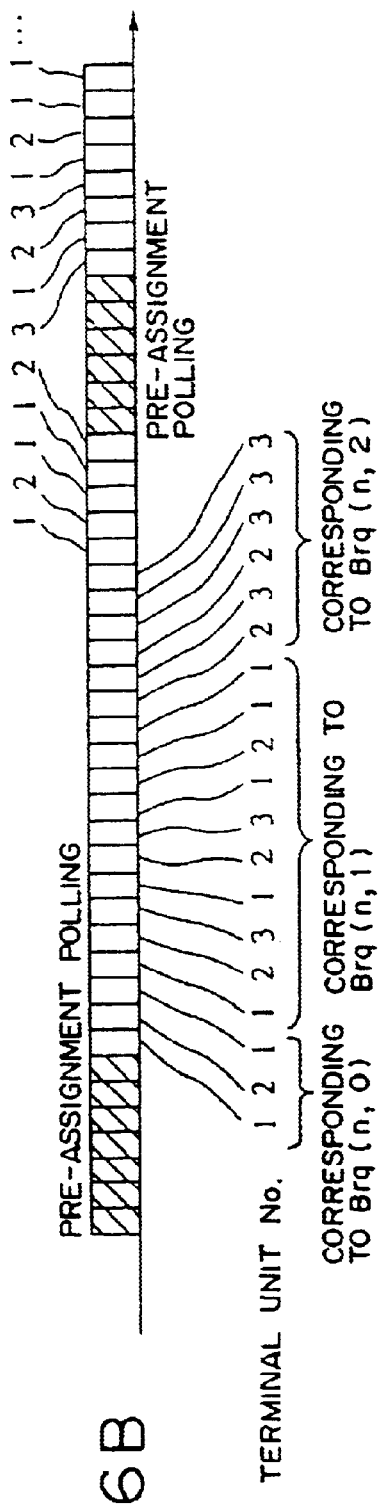
FIG. 6A
FIG. 6B

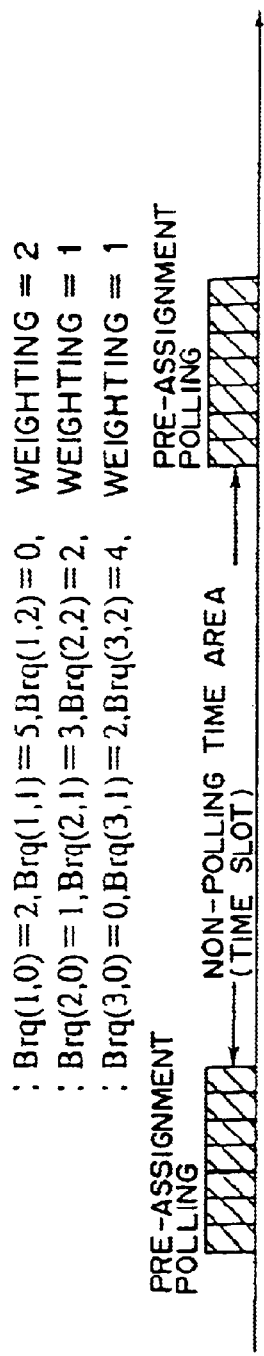
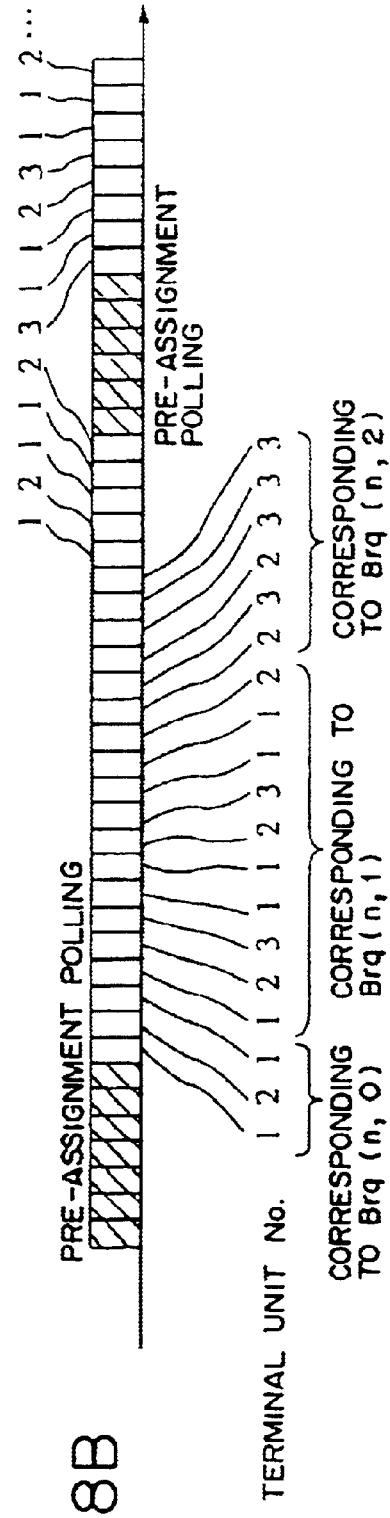
FIG. 8A
FIG. 8B

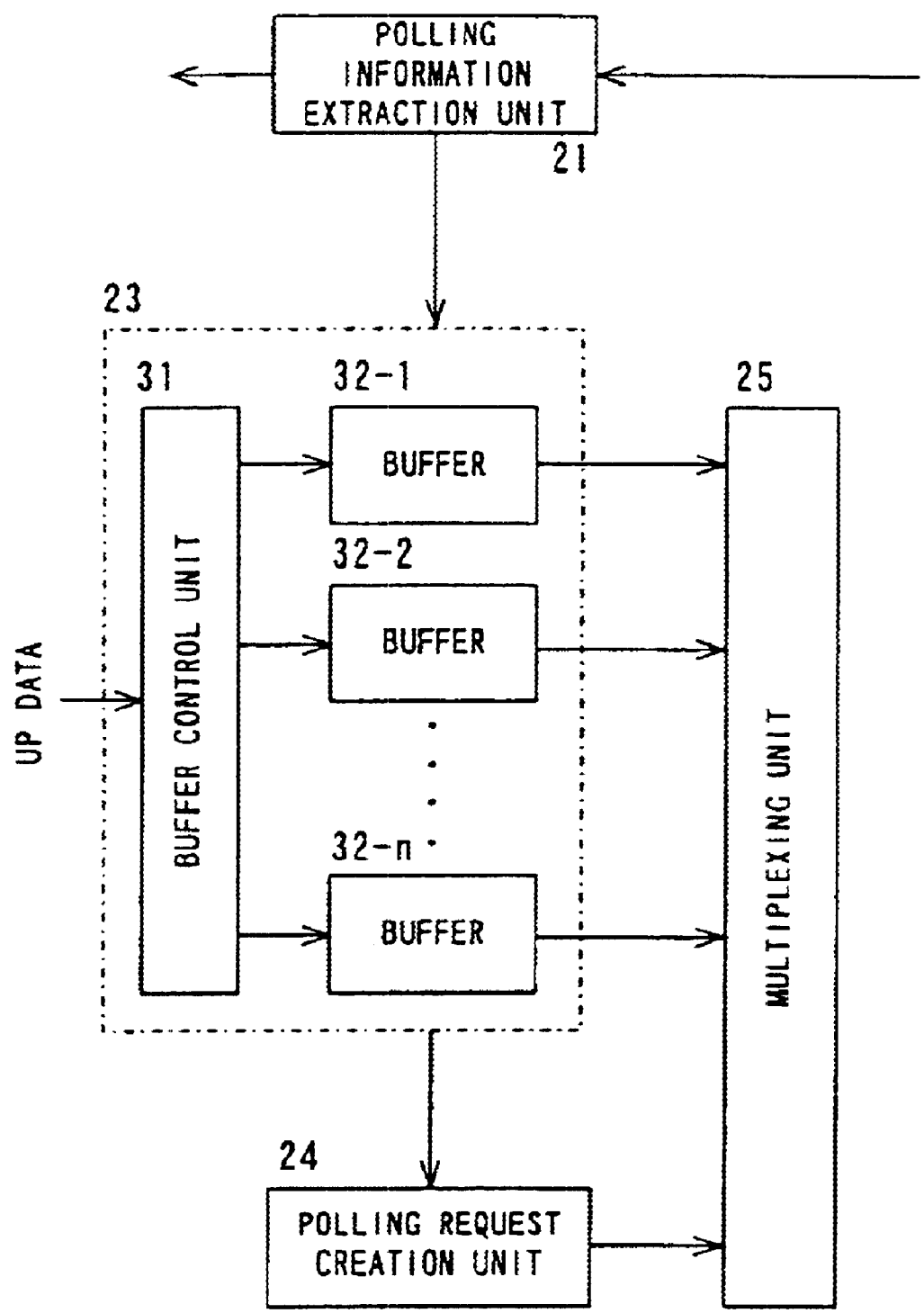
F I G. 9

BAND ALLOCATION METHOD AND TRANSMISSION SYSTEM FOR TRANSMITTING VARIABLE-LENGTH PACKETS

BACKGROUND OF THE INVENTION

1. Field of the Invention

The present invention relates to a band allocation method in a system for dividing a variable-length packet into cells, superimposing the cells on a time slot and transmitting the time slot and a transmission system realizing the method.

2. Description of Related Art

A transmission system is widely known in which a plurality of terminal units are connected to a network unit using branched optical transmission lines, etc., polling information is transmitted according to polling request information sent from a terminal unit and information divided into cells is transmitted from a terminal unit designated by the polling information. In this system, a band can be allocated to a terminal unit using polling information from a network unit. Such a band allocation is strongly desired.

FIG. 1 shows the rough configuration of a conventional transmission system, and in FIG. 1, a plurality of terminal units 52-1 through 52-n are connected to a network unit 51 via an optical transmission line 53. Specifically, this system comprises a multiplexer/demultiplexer 54 for connecting an optical transmission line 53 from the network unit 51 and optical transmission lines from the plurality of terminal units 52-1 through 52-n, and has a so-called PON (Passive Optical Network) or PDS (Passive Double Star) configuration. The terminal units 52-1 through 52-n correspond to subscriber line terminating units on the subscriber side, and a telephone set, facsimile transmitter/receiver, personal computer, etc., are connected to the terminal units 52-1 through 52-n.

The network unit 51 comprises an identification unit 55 for identifying polling request information, a control unit 56 and a creation unit 57 for creating polling information. The terminal units 52-1 through 52-n comprise a buffer 58 for temporarily storing transmission information and a request creation unit 59 for creating polling request information. A transmitter/receiver unit, optical/electrical (O/E) converter unit, etc., possessed by both the network unit 51 and terminal units 52-1 through 52-n, are not shown in FIG. 1 for simplicity.

When transmission information is stored in the buffer 58, the terminal units 52-1 through 52-n create polling request information using the request creation unit 59, and the polling request information is transmitted to the network unit 51. The network unit 51 receives the polling request information from a terminal unit, identifies the terminal unit which has transmitted the polling information using the identification unit 55, creates polling information using the creation unit 57 under the control of the control unit 56 and transmits the polling information to the terminal unit which has transmitted the polling request information.

The terminal units 52-1 through 52-n superimposes an information cell on the prescribed time slot of the polling information from the network unit 51 and transmits the information cell to the network unit 51. In this case, the network unit 51 can allocate a wide band to a prescribed terminal unit, for example, by repeatedly transmitting polling information to the terminal unit in response to the polling request information from a plurality of terminal units.

A method in which the network unit 51 sets an individual management time slot, makes the terminal units 52-1 through 52-n transmit information about the amount of transmission information stored in the buffer 58, executes the allocation process of a time slot in the next frame based on information about the amount of storage of a buffer and transmits polling information to the terminal units 52-1 through 52-n corresponding to the time slot allocation, is widely known (for example, see Japanese Patent Laid-open No. 10-107755).

A method for executing the time slot allocation process according to the amount of storage (amount of information queued) of a buffer, by comparing the amount of storage with a threshold value or according to the priority among the terminal units 52-1 through 52-n, and transmitting polling information to the terminal units 52-1 through 52-n accordingly, is also known (for example, Japanese Patent Laid-open No. 10-242981).

As described earlier, according to the conventional method, the network unit 51 transmits polling information based on band allocation carried out based on the amount of storage of a buffer of the terminal units 52-1 through 52-n, and each of the terminal units 52-1 through 52-n divides a frame or packet into cells and transmits the cells according to polling information from the network unit 51. Therefore, the network unit 51 can receive and process cells from the plurality of terminal units 52-1 through 52-n without collision.

According to a system for dividing a frame or packet into a plurality of cells and transmitting the cells, whether all the cells can be received is judged by assembling received cells into the frame or packet. During this time, cells composing the next frame or packet arrive. Therefore, if even one of the cells composing a frame or packet is lost, the frame or packet must be transmitted again. However, since cells composing the next frame or packet have already arrived, the re-transmission process becomes complicated, which was one problem. If a band is allocated based on only the amount of storage of a buffer, as in the conventional method and, for example, if the amount of storage of a buffer of a packet with a short packet length and the amount of storage of a buffer of a packet with a long packet length are the same, the same band is allocated to both the long and short packets, and cells are allocated to time slots in the same way in both cases. Therefore, in a system for transmitting data in units of packets, a packet cannot be efficiently divided into cells, multiplexed and transmitted, which was another problem.

SUMMARY OF THE INVENTION

The objective of the present invention is to carry out an efficient band allocation and to improve transmission efficiency when a variable-length packet is transmitted.

A method for allocating a band to transmit a variable-length packet, which is one of the aspects of the present invention, assumes a method for allocating a band to transmit a variable-length packet in a system where a plurality of terminal units connected to a network unit divide a variable-length packet into cells and transmit the cells according to polling information from the network unit.

According to this aspect of the present invention, the terminal units transmit polling request information including information about the number of cells composing a variable-length packet stored in a buffer, to a network unit, whereas the network unit allocates in order a time slot to the plurality of terminal units in units of variable-length packets according to the polling information and transmits polling information based on the allocated time slot.

The terminal units can also be designed so as to transmit polling request information including information about both the number of cells remaining in a buffer, composing a variable-length packet being read from the buffers by the terminal units and the number of cells composing the next variable-length packet to be transmitted.

The network unit can also be designed so as to allocate in order a time slot to a terminal unit in which a cell remains, so as to allocate in order a time slot to the terminal unit in units of cells of the next variable-length packet to be transmitted when the number of remaining cells becomes zero.

The system can also be configured in such a way that the polling request information further includes information indicating the service class of a variable-length packet stored in a buffer and that the network unit carries out with priority the time slot allocation based on the number of cells corresponding to the service class of a variable-length packet.

Alternatively, the network unit can be designed so as to allocate with priority a time slot based on a weight pre-set in each terminal unit.

A transmission system, which is another aspect of the present invention, assumes a transmission system in which a plurality of terminal units connected to a network unit divide a variable-length packet into cells and transmit the cells according to polling information from the network unit.

This aspect of the present invention is configured in such a way that each terminal unit comprises a buffer for temporarily storing variable-length packets, a polling request information creation unit for creating polling information including information about the number of cells composing each variable-length packet in the buffer and the number of cells remaining in the buffer, out of the cells composing a variable-length packet being read from the buffer in units of cells, and a polling information extraction unit for extracting polling information addressed to its own terminal unit from signals received from a network unit and making the terminal unit read the variable-length packet from the buffer in units of cells according the polling information. This aspect of the present invention is also configured in such a way that the network unit comprises a shared band control unit for allocating in order a time slot to each terminal unit according to information about the number of cells composing a variable-length packet, included in polling request information received from a plurality of terminal units.

The system can also be configured in such a way that the polling request information creation unit creates polling request information further including information about the service class of a variable-length packet in the buffer and in such a way that the shared band control unit allocates a time slot with priority according to the service class of a variable-length packet included in the polling request information.

The shared band control unit can also be designed so as to allocate a time slot to the terminal units based on a weight pre-set in each terminal unit.

The system can also be configured in such a way that the network unit further comprises a pre-assignment polling control unit for periodically transmitting polling information to a plurality of terminal units and in such a way that the shared band control unit allocates a time slot in a non-polling time area, which is a time period when polling information is not transmitted from the pre-assignment polling control unit.

The system can also be configured in such a way that the buffer stores a variable-length packet for each service class set in the variable-length packet, and a variable-length packet stored in the buffer is read in units of cells in the order of the service class according to the polling information extracted from the polling extraction unit and the variable-length packet is transmitted to the network unit.

Alternatively, the system can be configured in such a way that the buffer stores a variable-length packet for each service class set in the variable-length packet, the variable-length packet stored in the buffer is read in units of cells, the variable-length packet is transmitted to the network unit according to the polling information extracted by the polling information extraction unit, and another variable-length packet stored in the buffer is read in units of cells and transmitted when the number of remaining cells of one variable-length packet being read from the buffer becomes zero.

In any of the aspects of the present invention described above, a variable-length packet can be divided into cells in units of variable-length packets and transmitted. For example, if the packet length of a variable-length packet is long, that is, if the number of cells produced by dividing a variable-length packet is large, many time slots can be allocated to the packet. Therefore, even if a re-transmission process is required, data can be efficiently transmitted in units of variable-length packets.

BRIEF DESCRIPTION OF THE DRAWINGS

The present invention will be more apparent from the following detailed description when the accompanying drawings are referenced.

FIG. 3 shows retention packet information issued from the terminal unit of the present invention.

FIG. 4 is a flowchart showing a band allocation in the first preferred embodiment of the present invention.

FIGS. 6A and 6B show the band allocation in the second preferred embodiment of the present invention.

FIGS. 8A and 8B show the band allocation in the fourth preferred embodiment of the present invention.

FIG. 9 shows the substantial part of the fifth preferred embodiment of the present invention.

DESCRIPTION OF THE PREFERRED EMBODIMENTS

Figure 1:
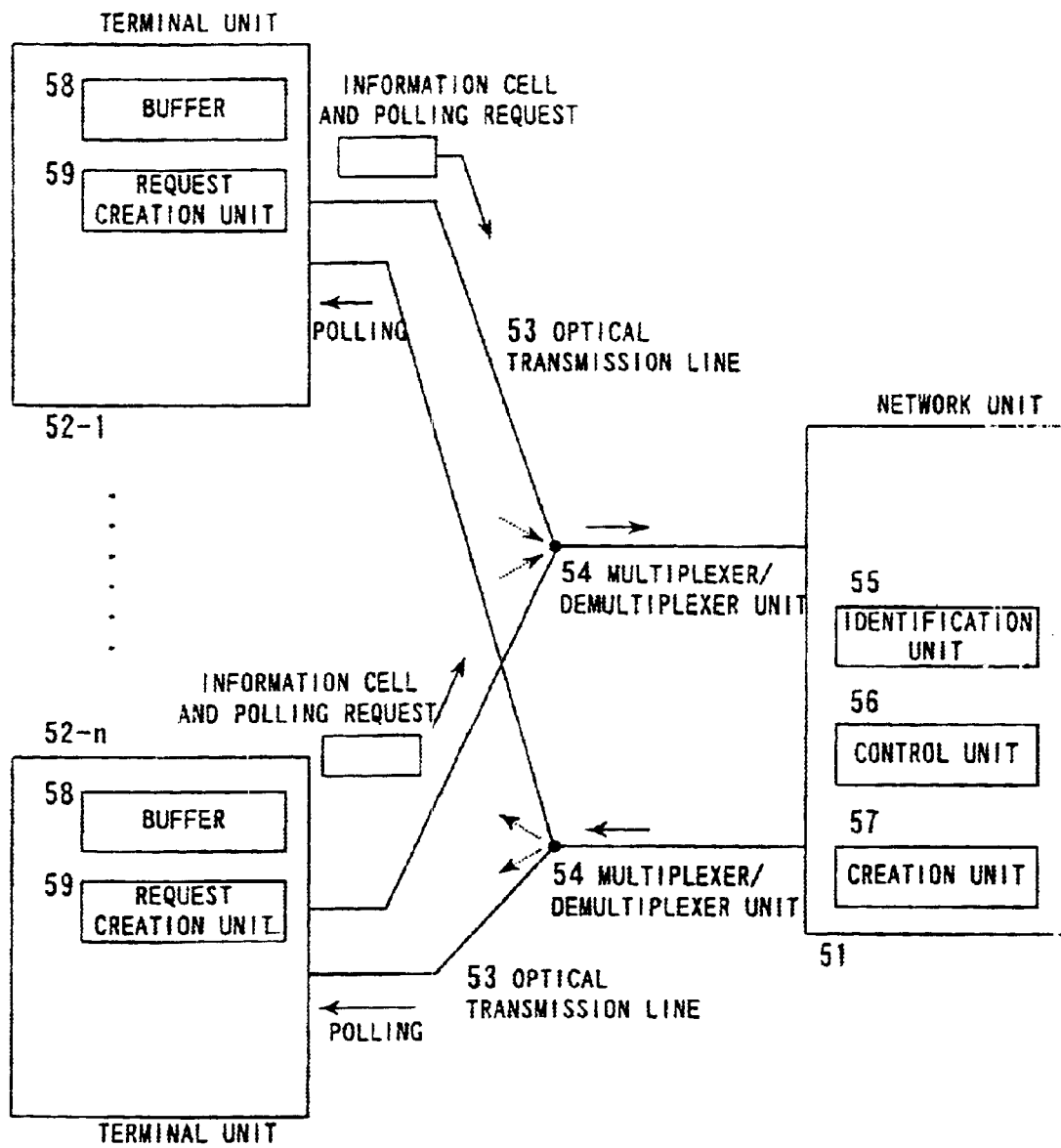
FIG. 1 shows the rough configuration of a conventional transmission system.
Figure 2:
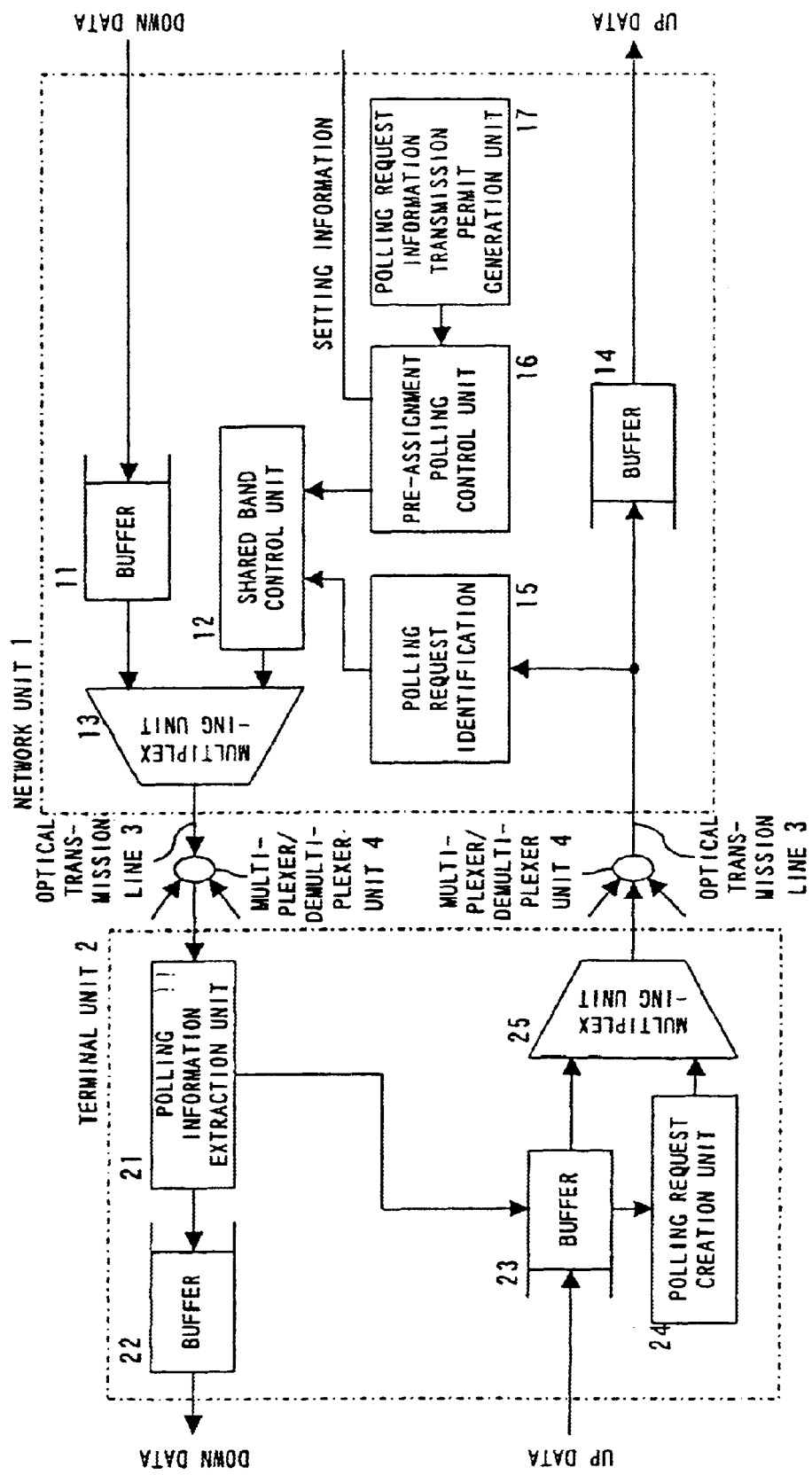
FIG. 2 shows the configuration of a system in which the present invention is applied.

FIG. 2 shows the configuration of a system in which the present invention is applied, and a network unit is referenced as 1, terminal units as 2, an optical transmission line as 3, a multiplexer/demultiplexer unit for combining and distributing optical signals as 4, buffers as 11 and 14, a shared band control unit as 12, a multiplexing unit as 13, a polling request information identification unit as 15, a pre-assignment polling control unit as 16, a polling request information transmission permit generation unit as 17, a polling information extraction unit as 21, buffers as 22 and 23, a polling request information creation unit as 24 and a multiplexing unit as 25.

A transmitter/receiver for dividing and assembling information data and an optical/electrical conversion function for transmitting/receiving the cell-divided information data as optical signals are not shown in FIG. 2 for simplicity. A cell transmitted as optical signals can be comprised of an overhead section of, for example, three bytes including preamble data, a header section including a VPI(virtual path identifier)/VCI(virtual channel identifier) of five bytes, etc., and data section of 48 bytes. The present invention can be applied not only when the cell-divided information is transmitted as optical signals but also when the cell-divided information is transmitted as electrical signals. The terminal units 2 correspond to subscriber line terminating units, and a telephone set, facsimile transmitter/receiver, personal computer, etc., are connected to the terminal units 2. The present invention processes a variable-length packet in units of packets, and a "variable-length packet" is also often simply described below as a "packet" unless otherwise specified.

In the system shown in FIG. 2, a plurality of terminal units are connected to the network unit 1 via the optical transmission line 3. When being designated by polling information transmitted from the network unit 1, each terminal unit 2 transmits cell-divided information to the network unit 1. In this way, the network unit 1 can receive and process the cell-divided information from the plurality of terminal units 2 via the multiplexer/demultiplexer unit 4 without collision. The basic operation of the system is described below.

When packets are stored in the buffer 23 of the terminal unit 2, the polling request information creation unit 24 creates polling request information including information about the number and length of the packets, inserts the polling request information, for example, in the data section or overhead section of an OAM (Operation, Administration and Maintenance) cell and transmits the polling request information from the multiplexing unit 25 to the network unit 1 via the optical transmission line 3 and multiplexer/demultiplexer unit 4.

The network unit 1 identifies the polling request information received from the terminal units 2 via the optical transmission line 3 and multiplexer/demultiplexer unit 4 using the polling request information identification unit 15 and notifies the shared band control unit 12 of the polling request information from the terminal unit 2. The pre-assignment polling control unit 16 is used to allocate the lowest band to each terminal unit 2, and this band can be pre-set using setting information. The polling request information transmission permit generation unit 17 is used to designate a time slot for transmitting polling request information, and a polling information transmission timing is selected taking into consideration the connection distance of the terminal unit 2, etc. A technology used in a system already known, such as PON, PDS, etc., can be used for such a timing control.

The shared band control unit 12 creates polling information for the terminal unit 2 based on both a polling request information identification signal from the polling request information identification unit 15 and a polling control signal from the pre-assignment polling control unit 16, and transmits the polling information via the multiplexing unit 13.

The terminal unit 2 extracts polling information addressed from the network unit 1 to its own terminal unit 2 using the polling information extraction unit 21, and adds a transmission notice to the buffer 23. The terminal unit 2 reads one cell portion of the cells obtained by dividing one packet of up data, stored in the buffer 23 using the notice, and transmits the one cell portion to the network unit 1 via the multiplexing unit 25. The network unit 1 stores received cells in the buffer 14, reads the cells in units of cells and produces up data. Down data from the network unit 1 are temporarily stored in the buffer 11, are read in units of cells and are transmitted to the terminal unit 2 via the multiplexing unit 13. The terminal unit 2 processes the data via the buffer 22 as down data.

The present invention monitors the number of packets stored in the buffer 23 of the terminal unit 2, the length of each packet (number of cells) and the number of the remaining cells of one packet of the packets being read from the buffer 23 in units of cells, and transmitted using the polling request information creation unit 24 and transmits polling request information including retention packet information indicating the stored content of the buffer 23, the number of the terminal unit 2, etc., to the network unit 1.

FIG. 3 shows retention packet information from the terminal unit in the preferred embodiment of the present invention, and it shows a case where service classes are set for retention packet information temporarily stored in the buffer 23 and being in a state of waiting to be transmitted. The retention packet information includes the number of remaining cells, Brq (n, 0) of a packet being read, corresponding to each of service classes 1, 2, . . . , that is, the number of remaining cells in the buffer, of the packet being read of a terminal unit No. n, the number of next group of cells to be transmitted, Brq (n, 1), the number of second group of cells to be transmitted, Brq (n, 2), . . . . Polling request information including this retention packet information is created in a polling request creation unit 24 and transmitted to the network unit 1, which, for example, can be made by inserting the polling information in the data section of an OAM cell periodically transmitted, as described earlier.

The network 1 allocates a band according to the retention packet information of polling request information. n in (n, i) is a terminal unit No., and i=0, 1, 2, . . . , in (n, i) indicates the number attached in order to packets with the number of a packet being read from the buffer 23 designated as 0. A case is shown where the packet length of a packet is indicated by the number of cells. Since the length of a packet stored in the buffer 23 is variable, the number of cells often differs for each packet.

FIG. 4 is a flowchart showing a band allocation in the first preferred embodiment of the present invention. The flowchart mainly shows the operation of a shared band control unit 12 of the network unit 1. n, Cn, N, Tcb and Brq (n, j) indicate a terminal unit No. (N or less), the value of the band allocation counter of a terminal unit No. n, the number of terminal units connected to the network unit 1, the shared band allocation threshold value and band request information about the j-th packet of the terminal unit No. n, respectively. This example shows a case where a band is allocated using only band request information Brq (n, K) based on the number of cells of the K-th packet. K=0 indicates band request information based on the remaining cells of a packet in the case where a part of cells composing a packet is read from the buffer 23. FIG. 4 shows band allocation operations based on this band request information.

First, Tcb=0, n=1, Cn=0 and j=1 are set as initial values (A1), and it is judged whether an un-allocated time slot (A2) remains. If no un-allocated time slot remains, this step (A1) is repeated. If an un-allocated time slot remains, it is judged whether Brq (n, K)>Tcb is satisfied (A3).

If Brq (n, K)>Tcb is satisfied, that is, if the number of cells of the K-th packet of a terminal unit No. n exceeds a shared band allocation threshold value Tcb, a time slot is allocated to terminal unit No. n (A4), and terminal unit No. n is incremented by one (n++) and Cn=0 is set (A5). Then, it is judged whether n<=N is satisfied (A6). Specifically, it is judged whether terminal unit No. n exceeds the number of connected terminal units, N. If the terminal unit No. n exceeds the number of connected terminal units, N and if the processes in steps (A2) through (A5) are completed for all the terminal units, the flow proceeds to step (A7), and shared band allocation threshold value Tcb is incremented by one (Tcb++) and n=1 is satisfied (A7). Then, the flow proceeds to step (A2). If in step (A6), n≦N is satisfied, the flow proceeds to step (A2).

If in step (A3), Brq (n, K)>Tcb is not satisfied, terminal unit No. n is incremented by one (n++), band allocation counter Cn for a terminal unit is incremented by one (Cn++) (A8), and it is whether band allocation counter Cn drops below the number of connected terminal units, N (A9). If the band allocation counter Cn does not drop below the number of connected terminal units, N, it is judged whether Tcb is 0 (Tcb=0) (A10). If shared band allocation threshold value Tcb is 0, an idle time slot is allocated (A11), n=1 and Cn=0 are set (A12) and the flow proceeds to step (A2).

If in step (A9), Cn<N is satisfied, it is judged whether n<=N is satisfied (13). If n<=N is satisfied, the flow proceeds to step (A3). If n<=N is not satisfied, Tcb is incremented by one (Tcb++), n=1 and Cn=0 are set (A14) and the flow proceeds to step (A3). If in step (A10), Tcb is not 0, Tcb=0, n=1 and Cn=0 are set (A15) and the flow proceeds to step (A3).

As described earlier, the terminal unit 2 reads a packet from the buffer 23 in units of cells and transmits the packet, and notifies the network unit 1 of the number of remaining cells of the packet, and also the number of following packets to be transmitted and the number of cells composing the next packet, if there is a packet to be transmitted, as polling request information. The network unit 1 modifies the polling pattern in the shared band control unit 12 and allocates a band in units of cells. Therefore, packets can be efficiently transmitted compared with a case where a band is simply allocated using only the amount of storage of a buffer. The parameters shown in FIG. 4 are updated by, for example, the polling request information inserted in an OAM cell periodically transmitted.

Figure 5:
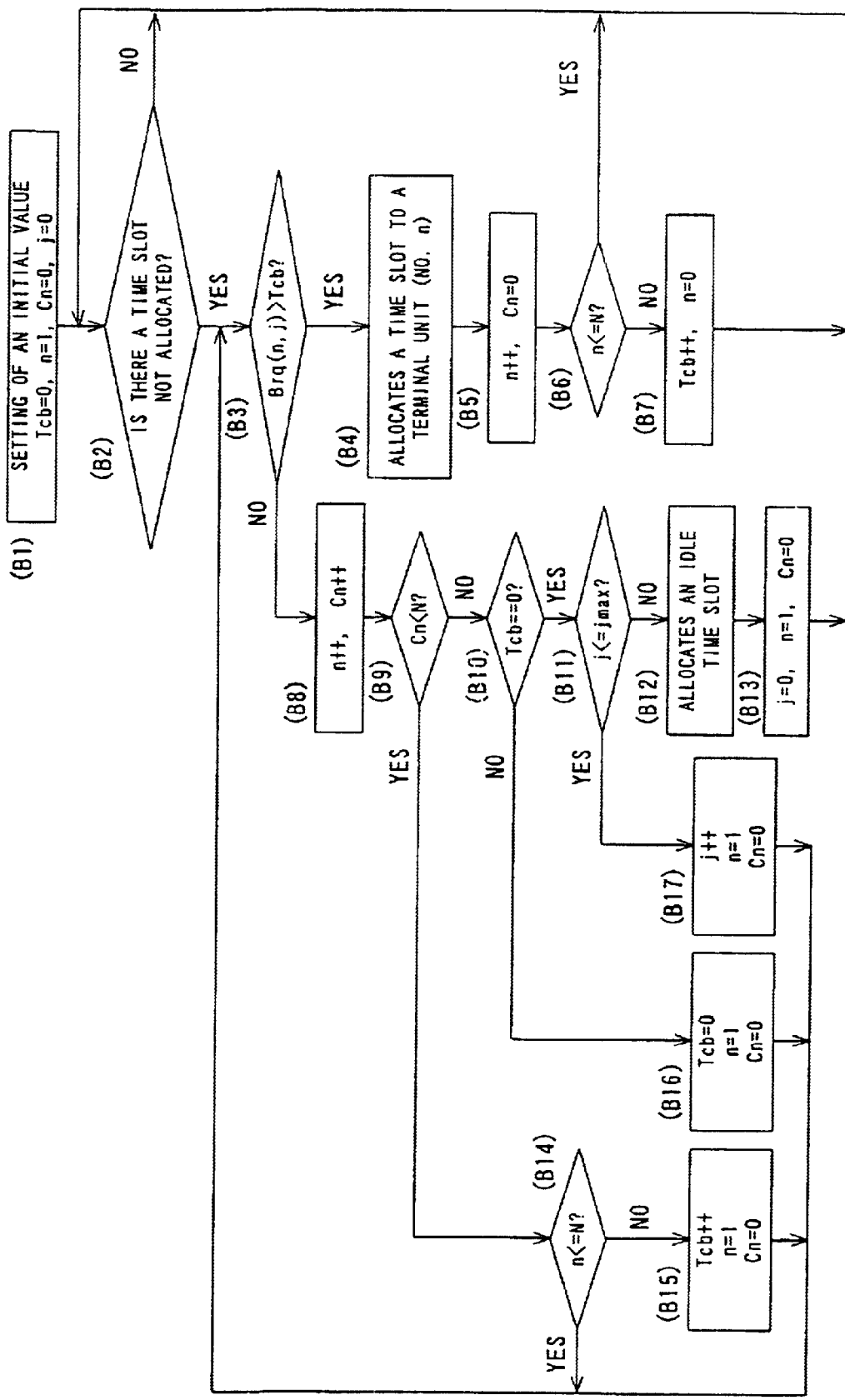
FIG. 5 is a flowchart showing a band allocation in the second preferred embodiment of the present invention.

FIG. 5 is a flowchart showing a band allocation in the second preferred embodiment of the present invention. The parameters shown in FIG. 5 are the same as those shown in FIG. 4. First, Tcb=0, n=1, Cn=0 and j=0 are set (B1), and it is judged whether there is an un-allocated time slot (B2). If there is an un-allocated time slot, it is judged whether Brq (n, j)>Tcb is satisfied (B3). If shared band allocation threshold Tcb drops below the number of cells of the j-th packet of a terminal unit No. n, a time slot is allocated to the terminal unit No. n (B4), terminal unit No. n is incremented by one (n++) and Cn=0 is set (B5).

Then, it is judged whether terminal unit No. n exceeds the number of connected terminal units N (n<=N) (B6). If terminal unit No. n does not exceed the number of connected terminal units, N, the flow proceeds to step (B2). If terminal unit No. n exceeds the number of connected terminal units, N, Tcb is incremented by one (Tcb++), n=1 is set (B7), and the flow proceeds to step (B2).

If in step (B3), Brq (n, j)>Tcb is not satisfied, terminal unit No. n is incremented by one (n++), terminal unit band allocation counter Cn is incremented by one (Cn++) (B8), and the value of terminal unit band allocation counter Cn and the number of connected terminal units N are compared (B9). If Cn<N is not satisfied, it is judged whether Tcb is 0 (B10). If shared band allocation threshold value Tcb is 0, it is judged whether j in Brq (n, j) equals or drops below a maximum value $j_{max}$ (B11). If j exceeds the maximum $j_{max}$, an idle time slot is allocated (B12), j=0, n=1 and Cn=0 are set (B13), and the flow proceeds to step (B2).

If in step (B9), Cn<N is satisfied, terminal unit No. n and the number of connected terminal units, N are compared (B14). If n≦N is satisfied, the flow proceeds to step (B3). If n≦N is not satisfied, shared band allocation threshold value Tcb is incremented by one (Tcb++), n=1 and Cn=0 are set (B15), and the flow proceeds to step (B3).

If in step (B10) shared band allocation threshold value Tcb is not 0, Tcb=0, n=1 and Cn=0 are set (B16) and the flows proceeds to step (B3). If in step (B11) $j \leq j_{max}$ is satisfied, j is incremented by one (j++), n=1 and Cn=0 are set, and the flow proceeds to step (B3).

As described earlier, the pre-assignment polling control unit 16 of the network unit 1 creates polling information corresponding to a band pre-set for each of the plurality of terminal units 2, and transmits the polling information to the shared band control unit 12. Since the polling request information identification unit 15 identifies polling information from the terminal unit 2, and transmits the polling information to the shared band control unit 12, the shared band control unit 12 checks an idle band other than a band used by the pre-assignment polling, and dynamically allocates a band to the terminal unit 2 based on the polling request information.

Specifically, the shared band control unit 12 first creates polling information for allocating a time slot to transmit one cell to terminal units in which the number of remaining cells of a buffer 23 exceeds 1. Then, when this process is completed for terminal units 2 equivalent to the number of connected terminal units, N, the shared band control unit 12 creates polling information for allocating a time slot to transmit one cell to terminal units in which the number of remaining cells exceeds 2. After that, the same process is repeated. In this case, this process is skipped for terminal units for which the allocation of a time slot for the number of remaining cells has been completed, and polling information for allocating a time slot is created only for terminal units in which un-allocated remaining cells still exist.

When the number of un-allocated remaining cells becomes zero, the shared band control unit 12 creates polling information for terminal units in whose buffer 23 a packet waiting to be transmitted is stored, and the process is repeated until the number of un-allocated remaining cells becomes zero as in the process of allocating a time slot to the remaining cells described above. Then, when the allocation of a packet to each terminal unit in units of cells is completed, the same process is repeated for the next packet waiting to be transmitted.

FIGS. 6A and 6B show the band allocation in the second preferred embodiment of the present invention. FIG. 6A shows pre-assignment polling information from the pre-assignment polling control unit 16. A time slot is fixedly allocated to all the terminal units or pre-set terminal units according to pre-assignment polling information continually transmitted in a prescribed cycle. Then, an interval between two pieces of the pre-assignment polling information is designated as a non-polling time area, and during the interval an allocation process is executed according to the above-described polling request information from the terminal units.

FIG. 6B shows an example of polling information from the shared band control unit 12, and it shows a case where the number of cells included in the retention packet information of the polling request information of terminal unit No. 1 is Brq (1, 0)=2, Brq (1, 1)=5 and Brq (1, 2)=0, the number of cells included in the retention packet information of the polling request information of terminal unit No. 2 is Brq (2, 0)=1, Brq (2, 1)=3 and Brq (2, 2)=2 and the number of cells included in the retention packet information of the polling request information of terminal unit No. 3 is Brq (3, 0)=0, Brq (3, 1)=2 and Brq (3, 2)=4.

Specifically, the number of remaining cells of a packet being read in units of cells, of terminal unit No. 1, the number of remaining cells of a packet being read in units of cells, of terminal unit No. 2 and the number of remaining cells of a packet being read in units of cells, of terminal unit No. 3 are 2, 1 and 0, respectively. Therefore, in a non-polling time area, one time slot is allocated to terminal unit No. 1. As a result, the number of un-allocated remaining cells becomes 1. Then, one time slot is allocated to terminal unit No. 2. As a result, the number of un-allocated remaining cells becomes 0. Then, since the number of un-allocated remaining cells of terminal unit No. 3 is 0, one time slot is allocated to terminal unit No. 1 whose number of un-allocated remaining cells is 1. In this way, the allocation process of a packet corresponding to Brq (n, 0) is completed.

Then, for a packet corresponding to Brq (n, 1), the allocation of a time slot to each terminal unit is continued until the number of un-allocated cells of the packet of each terminal unit becomes 0. In this case, since the numbers of cells of terminal units Nos. 1, 2 and 3 are 5, 3 and 2, respectively, first, one time slot is allocated to each of the terminal units Nos. 1, 2 and 3. Since the numbers of un-allocated cells of terminal units Nos. 1, 2 and 3 are not yet 0, one time slot is allocated to each of the terminal units Nos. 1, 2 and 3 again. Since the number of un-allocated cells of terminal units No. 3 becomes 0, this time, one time slot is allocated to only terminal units Nos. 1 and 2. Then, since the number of un-allocated cells of terminal units No. 2 becomes 0, this time, one time slot is allocated to only terminal unit No. 1 twice in succession.

The next packet corresponding to Brq (n, 2) indicates a case where the numbers of un-allocated cells of terminal units Nos. 1, 2 and 3 are 0, 2 and 4, respectively. A time slot is allocated to terminal units Nos. 2 and 3. Specifically, as shown in the lower part of FIG. 6B, a time slot is allocated to terminal units Nos. of "1, 2, 1", "1, 2, 3, 1, 2, 3, 1, 2, 1, 1" and "2, 3, 2, 3, 3, 3" corresponding to the packets.

The terminal unit Nos. shown in the upper part of FIG. 6B indicate cases where the same process is repeated. FIG. 6B shows a case where the allocation of a time slot is completed in one non-polling time area according to polling information. If the allocation of a time slot is not completed in one non-polling time area, the time slot allocation process is continued in the next non-polling time area.

Figures 7A, 7B:
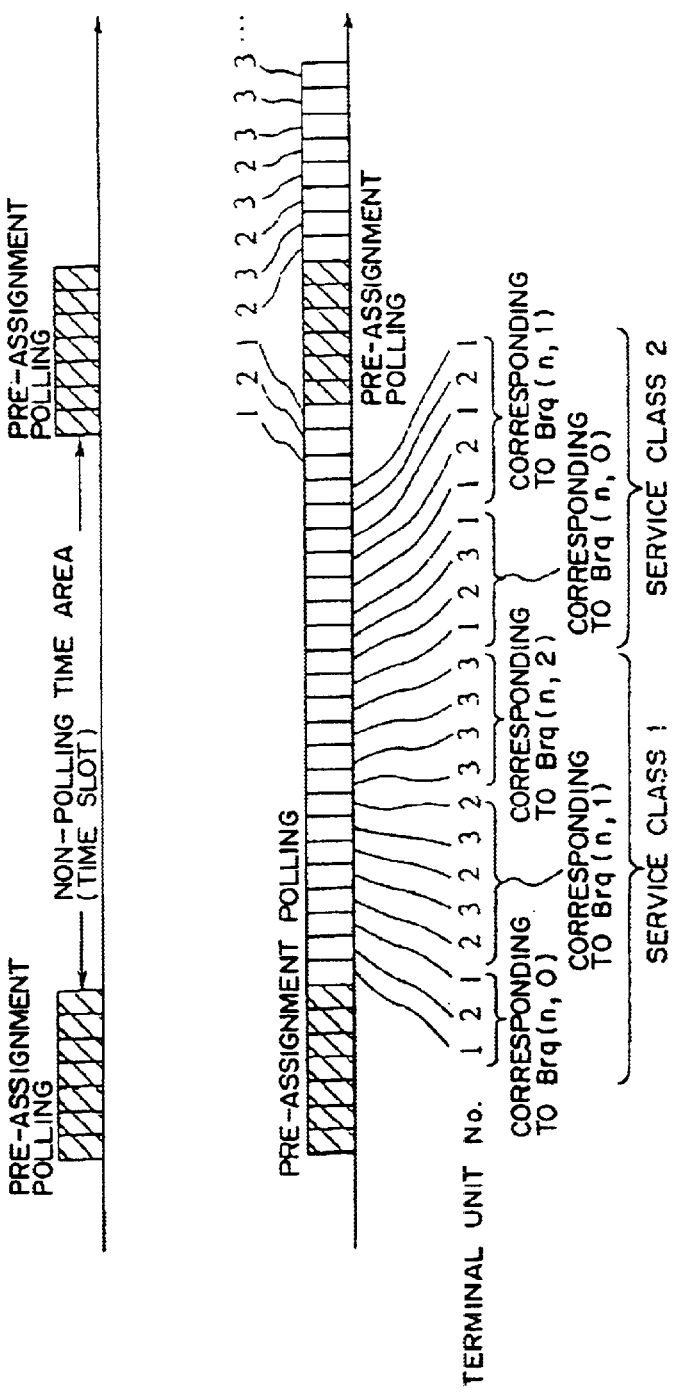
FIGS. 7A and 7B show the band allocation in the third preferred embodiment of the present invention.

FIGS. 7A and 7B show the band allocation in the third preferred embodiment of the present invention, and shows a case where a service class is set. The service class of a packet can be attached to the overhead section of the packet, etc., and as shown in FIG. 3, the retention packet information of a packet stored in the buffer 23 of a terminal unit is created using the number of cells corresponding to a service class, etc., in the polling request information creation unit 24. Alternatively, the system can be configured in such a way that a buffer 23 is provided corresponding to a service class and a packet stored in the buffer 23 is divided into cells and transmitted.

A case is shown where in polling request information of terminal units Nos. 1, 2 and 3, the service class 1 of terminal unit No. 1 is Brq (1, 0)=2 and the service class 2 of terminal unit No. 1 is Brq (1, 0)=2 and Brq (1, 1)=3, the service class 1 of terminal unit No. 2 is Brq (2, 0)=1 and Brq (2, 1)=3 and the service class 2 of terminal unit No. 2 is Brq (2, 0)=1 and Brq (2, 1)=2, and the service class 1 of terminal unit No. 3 is Brq (3, 0)=0, Brq (3, 1)=2 and Brq (3, 2)=4 and the service class 2 of terminal unit No. 3 is Brq (3, 0)=1.

FIG. 7A shows pre-assignment polling information from the pre-assignment polling control unit 16 as shown in FIG. 6A, and FIG. 7B shows pre-assignment polling information from the shared band control unit 12. The shared band control unit 12 first allocates a time slot in units of the cells of a packet of service class 1 according to polling request information from each terminal unit. In this case, since the numbers of remaining cells of service class 1, of terminal units Nos. 1, 2 and 3 are 2, 1 and 0, respectively, a time slot is allocated in the order of terminal unit Nos. 1, 2 and 1. As a result, the number of un-allocated remaining cells corresponding to Brq (n, 0) becomes 0.

Then, since the number of un-allocated cells of the first packet Brq (n, 1) (n is terminal unit No.) of service class 1, of terminal units Nos. 1, 2 and 3 are 0, 3 and 2, respectively, a time slot is allocated in the order of terminal unit Nos. 2, 3, 2, 3 and 2. Then, since only the number of un-allocated cells of the second packet of service class 1, of terminal unit No. 3 is not 0 but 4, four consecutive time slots are allocated to terminal unit No. 3. The process of a packet of service class 1 is completed by this allocation process.

Then, for a packet of service class 2, a time slot is similarly allocated in order, corresponding to the number of un-allocated cells. In this case, a time slot is allocated in the order of terminal units Nos. 1, 2, 3 and 1 corresponding to the number of un-allocated remaining cells, and for the next packet, a time slot is allocated in the order of terminal units Nos. 1, 2, 1, 2 and 1 corresponding to un-allocated remaining cells. Specifically, as shown in the lower part of FIG. 7B, a time slot is allocated in the order indicated by terminal units Nos. corresponding to service classes 1 and 2. Since packets are processed in the descending order of a service class, the service class is set to a high order if the shortening of a delay time is required as in a voice packet. The terminal unit Nos. shown in the upper part of FIG. 7B indicate a case where the same process is repeated.

FIGS. 8A and 8B show the band allocation in the fourth preferred embodiment of the present invention and they show a case where a weight is attached corresponding to a terminal unit. FIG. 8A shows pre-assignment polling information from the pre-assignment polling control unit 16 as in FIGS. 6A and 7A. FIG. 8B shows polling information from the shared band control unit 12. FIGS. 8A and 8B show a case where the band request information of terminal unit No. 1 is Brq (1, 0)=2, Brq (1, 1)=5 and Brq (1, 2)=0, the band request information of terminal unit No. 2 is Brq (2, 0)=1, Brq (2, 1)=3 and Brq (2, 2)=2 and the band request information of terminal unit No. 3 is Brq (3, 0)=0, Brq (3, 1)=2 and Brq (3, 2)=4, assuming that terminal units Nos. 1, 2 and 3 are weighted with 2, 1 and 1, respectively.

Therefore, the number of un-allocated remaining cells of a packet corresponding to Brq (n, 0) becomes zero by allocating a time slot in the order of terminal units Nos. 1, 2 and 1 corresponding to the number of un-allocated remaining cells. For the next packet corresponding to Brq (n, 1), first, a time slot is allocated in the order of terminal units Nos. 1, 2 and 3, then one time slot is allocated to terminal unit No. 1 with a heavy weight, a time slot is allocated in the order of terminal units Nos. 1, 2 and 3, then one time slot is allocated to terminal unit No. 1 with a heavy weight and one time slot is allocated to terminal units Nos.1 and 2 which have an un-allocated remaining cell.

Since there remain only packets of terminal units Nos. 2 and 3 with a weight of 1, as described earlier, a time slot is allocated in order until the numbers of un-allocated remaining cells becomes zero. Thus, as shown in the lower part of FIG. 8B, a time slot is allocated in the order as indicated by terminal units Nos. The terminal units Nos. shown in the upper part of FIG. 8B indicate cases where the same process is repeated.

Although in this preferred embodiment, a case is shown where when a time slot is allocated in order, one more time slot is allocated to a terminal unit with a heavy weight, a plurality of weight steps are provided like 1, 2, 3, . . . , and when a time slot is allocated in order, a plurality of time slots can also be allocated corresponding to the weights.

FIG. 9 shows the substantial part of the fifth preferred embodiment of the present invention and it shows the major components of the terminal unit 2 shown in FIG. 2. A polling information extraction unit, a buffer, a polling request information creation unit, a multiplexing unit, a buffer control unit and a buffer unit are referenced as 21, 23, 24, 25, 31 and 32-1 to 32-n, respectively. Specifically, FIG. 9 shows a case where the buffer 23 shown in FIG. 2 is comprised of a plurality of buffer units 32-1 to 32-n, and if a service class is set in a packet of up data, the buffer units 32-1 to 32-n are assigned corresponding to the service classes.

For example, the system can be configured in such a way that the buffer units 32-1 to 32-2 are provided corresponding to service classes 1 and 2 shown in FIGS. 7A and 7B and the buffer control unit 31 identifies service class information in the header section of a packet, and in the case of up data of service classes 1 and 2, the service class information is stored in the buffers 32-1 and 32-2, respectively.

Since each of the buffer units 32-1 to 32-n corresponds to a service class, the polling request information creation unit 24 creates retention packet information including the number of packets for each service class and the number of cells composing each packet, and further creates polling information provided with the terminal unit No. etc., and transmits the polling information to the network unit Polling information from the network unit 1 is extracted from a polling information extraction unit 21, is read from the buffer 23 in units of cells, and is transmitted to the network unit 1 via a multiplexing unit 25. In this case, first, a packet is read from the buffer unit 32-1 of service class 1 in units of cells according to the polling information, and then is read from the buffer unit 32-2 of the next service class 2 according to the polling information after the numbers of remaining cells of all the stored packets become zero.

Therefore, the division into cells of a packet corresponding to a service class and the transmission of the cells can be easily controlled compared with a case where packets of different service classes are mixed and stored in the buffer 23.

The buffer 23 is comprised of a plurality of buffer units 32-1 to 32-n, and each of the buffer units 32-1 to 32-n is provided with an area corresponding to the maximum packet length of a variable-length packet. Each packet of up data is distributed to and stored in the buffer units 32-1 to 32-n in order, is divided into cells and transmitted according to polling information from the network unit 1, and when the number of remaining cells in one buffer unit becomes zero, the transmission of one packet is completed. Then, a packet is read from the next buffer unit in units of cells and is transmitted according to the next polling information. Therefore, the division into cells of a packet and the transmission of the cells can be easily controlled.

As described above, the present invention relates to both a band allocation method and a band allocation system for transmitting variable-length packets according to polling information from a network unit 1. Terminal units 2 transmit polling request information including the number of cells composing a variable-length packet stored in a buffer 23 to the network unit 1. The network unit 1 allocates in order a time slot to a plurality of the terminal units 2 in units of variable-length packets, and transmits polling information to the plurality of terminal units 2. In this way, packets can be divided into cells and transmitted in units of variable-length packets.

Therefore, since if the packet length of a variable-length packet is long, that is, the number of cells is large, the number of time slots to be allocated to the packet can be increased, and packets can be efficiently transmitted in units of variable-length packets even if re-transmission is needed, which is an advantage.

Even if band allocation is carried out corresponding to a service class for each variable-length packet, the number of time slots to be allocated to a variable-length packet with a high-order service class can be increased by dividing packets into cells and transmitting in units of variable-length packets, thereby enabling the improvement of serviceability. A wide band can be automatically allocated to a major terminal unit 2 by weighting the terminal unit 2. In these cases, packets can be easily processed in units of variable-length packets by composing the buffer 23 of such a terminal unit 2 of a plurality of buffer units and using each buffer unit for each service class or in units of variable-length packets, which is another advantage.

What is claimed is:

1. A method for allocating a band to transmit a variable-length packet in a system where a plurality of terminal units connected to a network unit divides a variable-length packet into cells and transmits divided cells according to polling information from the network unit, comprising:

transmitting polling request information including information about both a number of cells composing a variable-length packet in a buffer and a number of cells remaining in the buffer, comprising the variable-length packet being read from the buffer in units of cells to the network;

allocating in order a time slot to a plurality of the terminal units in units of the variable-length packets according to the polling request information; and transmitting polling information from the network unit according to the allocated time slot.

2. The method according to claim 1, wherein said polling request information further includes information about a respective number of cells composing each of the next variable-length packets, and said time slot is allocated in order to terminal units in which a cell remains, and when a number of remaining cells becomes zero, said time slot is allocated to the terminal unit in units of cells of the next variable-length packet to be transmitted.

3. The method according to claim 1, wherein the polling request information further includes information indicating a service class of the variable-length packet stored in the buffer, and said time slot allocation in accordance with the number of cells is carried out with priority according to a service class of the variable-length packet.

4. The method according to claim 1, wherein said time slot allocation is carried out with priority according to a weight pre-set in each of the terminal units.

5. A transmission system in which a plurality of terminal units connected to a network unit divides a variable-length packet into cells and transmits divided cells according to polling information from the network unit, the terminal unit comprising:
  a buffer temporarily storing variable-length packets;
  a polling request information creation unit creating polling request information including information about both a number of cells composing each variable-length packet in the buffer and a number of cells remaining in the buffer out of cells composing a variable-length packet being read from the buffer in units of cells; and
  a polling information extraction unit extracting polling information addressed to its own terminal unit from signals received from the network unit, and making the terminal unit read a variable-length packet from the buffer in units of cells according to the polling information, and the network unit comprising
  a shared band control unit allocating a time slot to each terminal unit in order according to information about a number of cells composing a variable-length packet, included in the polling request information received from the terminal unit.

6. The system according to claim 5, wherein
  said polling request information creation unit creates polling request information further including information indicating a service class of the variable-length packet in the buffer, and
  said shared band control unit carries out the time slot allocation with priority according to information about a service class of a variable-length packet, included in the polling request information.

7. The system according to claim 5, wherein said shared band control unit carries out the time slot allocation with priority according to a weight pre-set in each of the terminal units.

8. The system according to claim 5, wherein
  said network unit further comprises a pre-assignment polling control unit periodically transmitting polling information to the terminal units, and
  said shared band control unit allocates the time slot in a non-polling time area, which is a time period other than a time period used to transmit the polling information from the pre-assignment polling control unit.

9. The system according to claim 5, wherein
  said buffer stores the variable-length packet for each service class set in the variable-length packet, and
  a variable-length packet stored in said buffer is read from said buffer in an order corresponding to the service class in units of cells according to polling information extracted by said polling information extraction unit and is transmitted to said network unit.

10. The system according to claim 5, wherein
  said buffer stores the variable-length packet for each service class set in the variable-length packet, and
  a variable-length packet stored in said buffer is read in units of cells, is transmitted to said network unit according to polling information extracted by said polling information extraction unit, and when a number of remaining cells in one variable length packet read from said buffer becomes zero, another variable-length packet stored in said buffer is read and transmitted in units of cells.

11. A terminal unit in a transmission system where a plurality of terminal units connected to a network unit divides a variable-length packet into cells and transmits divided cells according to polling information from the network unit, comprising:
  a buffer temporarily storing variable-length packets;
  a polling request information creation unit creating polling request information including information about both a number of cells composing each variable-length packet in the buffer and a number of cells remaining in the buffer out of cells composing a variable-length packet being read from the buffer in units of cells; and
  a polling information extraction unit extracting polling information addressed to its own terminal unit from signals received from the network unit, and making the terminal unit read a variable-length packet from the buffer in units of cells according to the polling information.

12. A network unit in a transmission system where a plurality of terminal units connected to a network unit divides a variable-length packet into cells and transmits divided cells according to polling information from the network unit, comprising:
  a polling request information extraction unit extracting the polling request information from signals received from said terminal units; and
  a shared band control unit allocating a time slot to each terminal unit in order according to information about a number of cells composing a variable-length packet, included the polling request information; wherein
  said polling request information includes information about both a number of cells composing the variable-length packet in a buffer of the terminal unit and a number of cells remaining in the buffer, comprising the variable-length packet being read from the buffer in units of cells.

13. A transmission system in which a plurality of terminal units connected to a network unit divides a variable-length packet into cells and transmits divided cells according to polling information from the network unit, the terminal unit comprising:
  a buffer temporarily storing variable-length packets;
  polling request information creation means for creating polling request information including information about both a number of cells composing each variable-length packet in the buffer and a number of cells remaining in the buffer out of cells composing a variable-length packet being read from the buffer in units of cells; and
  polling information extraction means for extracting polling information addressed to its own terminal unit from signals received from the network unit, and for making the terminal unit read a variable-length packet from the buffer in units of cells according to the polling information, and the network unit comprising
  shared band control means for allocating a time slot to each terminal unit in order according to information about a number of cells composing a variable-length packet, included in the polling request information received from the terminal unit.

14. A terminal unit in a transmission system where a plurality of terminal units connected to a network unit divides a variable-length packet into cells and transmits divided cells according to polling information from the network unit, comprising:

a buffer temporarily storing variable-length packets;

polling request information creation means for creating polling request information including information about both a number of cells composing each variable-length packet in the buffer and a number of cells remaining in the buffer out of cells composing a variable-length packet being read from the buffer in units of cells; and polling information extraction means for extracting polling information addressed to its own terminal unit from signals received from the network unit, and for making the terminal unit read a variable-length packet from the buffer in units of cells according to the polling information.

15. A network unit in a transmission system where a plurality of terminal units connected to a network unit divides a variable-length packet into cells and transmits divided cells according to polling information from the network unit, comprising:

polling request information extraction means for extracting the polling request information from signals received from said terminal units; and shared band control means for allocating a time slot to each terminal unit in order according to information about a number of cells composing a variable-length packet, included the polling request information; wherein said polling request information includes information about both a number of cells composing the variable-length packet in a buffer of the terminal unit and a number of cells remaining in the buffer, comprising the variable-length packet being read from the buffer in units of cells.

* * * * *